A. KIRBY.
RESILIENT WHEEL.
APPLICATION FILED JAN. 5, 1915.

1,153,119.

Patented Sept. 7, 1915.
2 SHEETS—SHEET 1.

Witnesses
Fenton H. Belt
J. W. Sherwood

Inventor
Arthur Kirby
By Franklin H. Hoyt
Attorney

A. KIRBY.
RESILIENT WHEEL.
APPLICATION FILED JAN. 5, 1915.
1,153,119.
Patented Sept. 7, 1915.
2 SHEETS—SHEET 2.
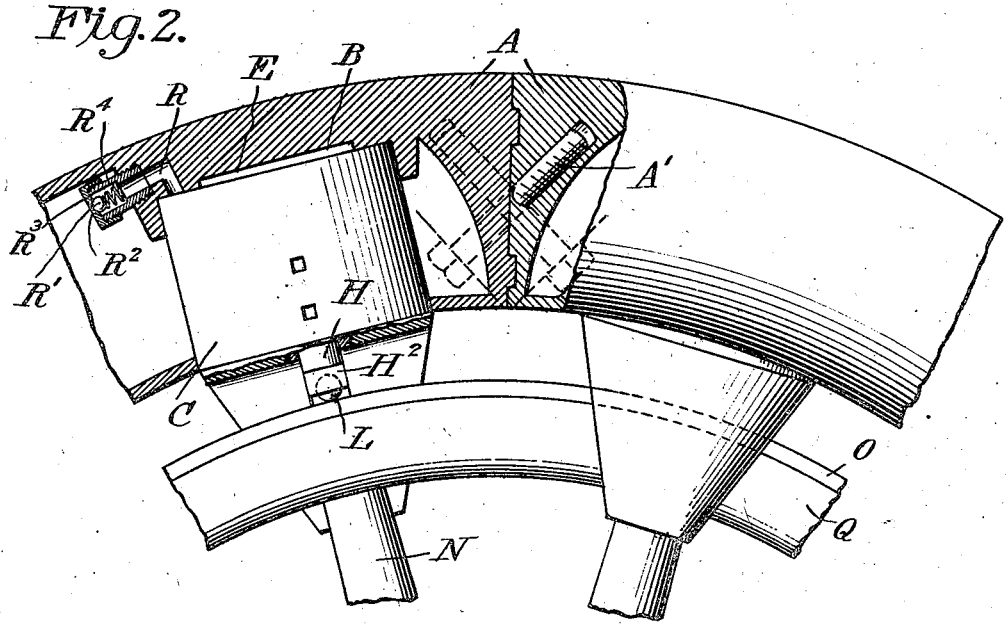
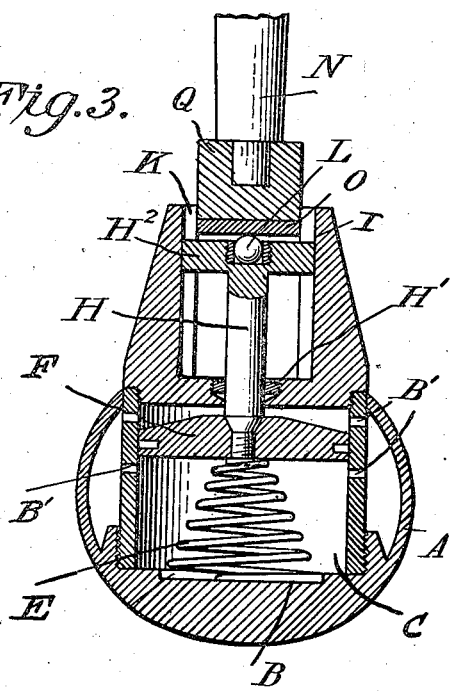
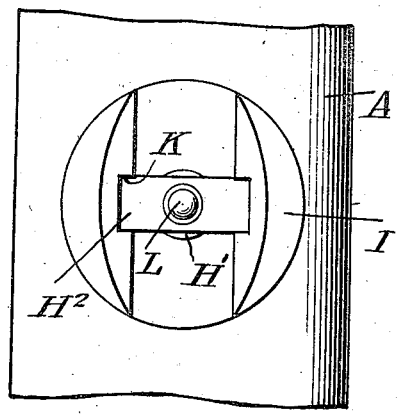
Witnesses
Fenton S. Belt
J. H. Sherwood
Inventor
Arthur Kirby
By Franklin H. Hough
Attorney

UNITED STATES PATENT OFFICE.

ARTHUR KIRBY, OF UNIONVILLE, MISSOURI.

RESILIENT WHEEL.

1,153,119.　　　　Specification of Letters Patent.　　Patented Sept. 7, 1915.

Application filed January 5, 1915. Serial No. 628.

*To all whom it may concern:*

Be it known that I, ARTHUR KIRBY, a citizen of the United States, residing at Unionville, in the county of Putnam and State of Missouri, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient tires, designed as substitutes for pneumatic tires, and comprises a simple and efficient device of this nature having various details of construction, combinations and arrangements of parts which will be hereinafter fully described, shown in the accompanying drawings and then specifically defined in the appended claims.

Figure 1:
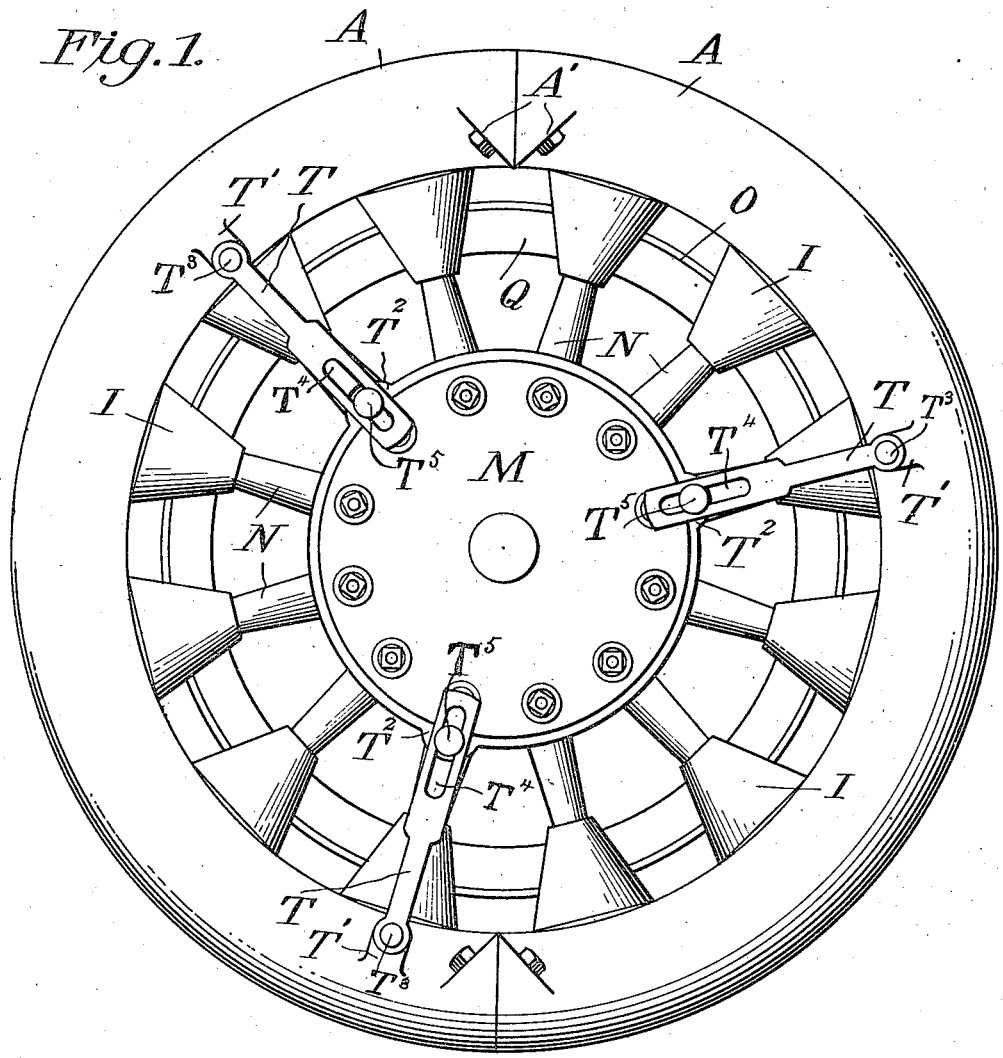
Figure 5:
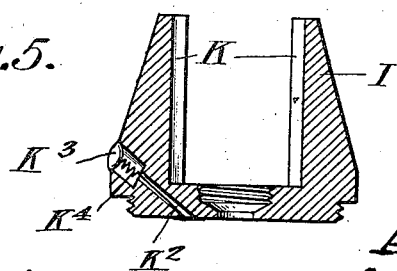

My invention is illustrated in the accompanying drawings, in which:

Figure 1 is a side elevation of a wheel having a tire applied thereto and made in accordance with my invention. Fig. 2 is an enlarged detail in elevation of a portion of the tire, a part being in section. Fig. 3 is a cross sectional view. Fig. 4 is a plan view of the inner end of one of the cylinder heads, and Fig. 5 is a detail sectional view through a cylinder head.

Reference now being had to the details of the drawings by letter, A, A designate the sections of the tire, the adjacent ends of which are provided with tongue and groove connections, and A' are bolts engaging diagonally disposed holes in the adjacent ends of the tire sections and serving as means for holding the same together. Each tire section is provided with a series of circular-outlined recesses, the circumferential walls of which are threaded for the threaded ends of the cylinders C and the bottom of each recess has a sunken portion B in which the large end of the coiled spring E is positioned. A piston F with suitable packing ring is mounted one in each cylinder, the wall of the latter being provided with vent apertures B' to prevent vacuum forming in the cylinder when the piston is reciprocated and the upper end of the spring bears yieldingly against the inner surface of the piston. Each piston is apertured for the reception of a piston rod H, mounted in a suitable packing ring H', seated in a countersunken portion of the cylinder head I, which latter has at positions diametrically opposite the guideways K, adapted to be engaged by the opposite ends of the cross heads H² at the end of the piston stem, as shown clearly in Fig. 4 of the drawings. The outer end of the piston stem is recessed for the reception of the ball bearing L, and O is a metallic tire mounted upon the felly Q which in turn is fastened to the spokes N which radiate from the circumference of the brake drum M, shown in Fig. 1.

A port, designated by letter R, leads from each cylinder and provided with a spring-pressed check valve R', regulating the port R² in the cap R³ which fits over the end of the hollow plug R⁴. Said valve is provided so that, when the car stops and the cup loses its compression, the spring E will force it back.

Referring to Fig. 1 of the drawings will be seen bars T, pivoted at their outer ends to the lugs T³ upon the tire and each bar is slotted at at T⁴ through which the pivots T⁵, projecting from the drum, pass. In said drawing I have shown three of said slotted bars equidistant and provided for the purpose of causing the rim and drum to rotate together, allowing a yielding action to offset any jar incident to sudden starting or stopping of the rotation of the wheel and at the same time allowing the wheel to yield to take up vibrations.

In Fig. 5 of the drawings, an oil duct K² is shown leading diagonally through the wall of the cup and a spring-pressed valve K³ normally closes the recess K⁴ formed in the wall of the cup and from which the duct leads, said duct being provided to allow oil to be inserted when desired for the purpose of lubricating the piston.

In operation, when a wheel made in accordance with my invention is rotating, the pressure coming upon the various pistons will cause a cushioning effect by the compression of the air within the various cylinders and, when the weight is relieved successively from the various cylinders, the pistons will be returned to their normal positions and serve as an efficient means for taking up vibration incident to the wheel passing over obstructions.

What I claim to be new is:—

1. A resilient wheel comprising a tire made up of sections fastened together, a series of pneumatic cylinders mounted in each tire section, a cylinder head fitted to each cylinder, a piston rod movable through each piston head, a piston mounted in each cylinder and secured to the piston rod, a felly and spokes connected thereto, a drum from which the spokes radiate, a metallic rim upon the felly, and ball bearings between the felly and said piston rod.

2. A resilient wheel comprising a tire made up of sections fastened together, a series of pneumatic cylinders mounted in each tire section, a cylinder head fitted to each cylinder, a piston rod movable through each piston head, a piston mounted in each cylinder and secured to the piston rod, a cross head upon the piston rod, means in each head for guiding said cross head, a drum and spokes radiating therefrom, a felly secured to the spokes, a metallic rim upon the felly, and ball bearings between the metallic rim and piston rod.

3. A resilient wheel comprising a tire made up of sections fastened together, a series of pneumatic cylinders mounted in each tire section, a chambered cylinder head secured to each cylinder, a piston rod movable through said head, a piston upon the rod, a spring bearing yieldingly against the piston, the wall of the chambered part of the head being grooved, a cross head upon the piston rod movable within said grooves, a drum, spokes radiating therefrom, a felly secured to the spokes, a metallic rim secured to the felly, and ball bearings between the rim and piston rod.

4. A resilient tire made up of sections, each provided with series of recesses, the walls of which are threaded and each recess having a counter recess in the bottom thereof, a spring seated in said counter recess, a cylinder having threaded connection with the walls of each recess, a head fitted to each cylinder, a piston within each cylinder and bearing against said spring, a stem fixed to the piston and movable through said head, a drum, spokes radiating from the drum, a rim upon the felly, and ball bearings between the rim and piston rod.

5. A resilient tire made up of sections, each provided with series of recesses, the walls of which are threaded and each recess having a counter recess in the bottom thereof, a spring seated in said counter recess, a cylinder having threaded connection with the walls of each recess, a head fitted to each cylinder, a piston within each cylinder and bearing against said spring, a stem fixed to the piston and movable through said head, a drum, spokes radiating from the drum, a rim upon the felly, ball bearings between the rim and piston rod, and pull rods pivotally connecting the drum and sections of the tire.

6. A resilient tire made up of sections, each provided with series of recesses, the walls of which are threaded and each recess having a counter recess in the bottom thereof, a spring seated in said counter recess, a cylinder having threaded connection with the walls of each recess, a head fitted to each cylinder, a piston within each cylinder and provided with a valve-regulated duct communicating with the interior of the cylinder, a stem fixed to the piston and movable through said head, a drum, spokes radiating from the drum, a rim upon the felly, ball bearings between the rim and piston rod, and pull rods pivotally connecting the drum and sections of the tire.

In testimony whereof I hereunto affix my signature in presence of two witnesses.

ARTHUR KIRBY.

Witnesses:
MATTHEW FLYNN,
MANLEY McKINLEY.